June 17, 1924.
J. MOYER
BULL TIE
Filed May 22, 1922
1,498,397
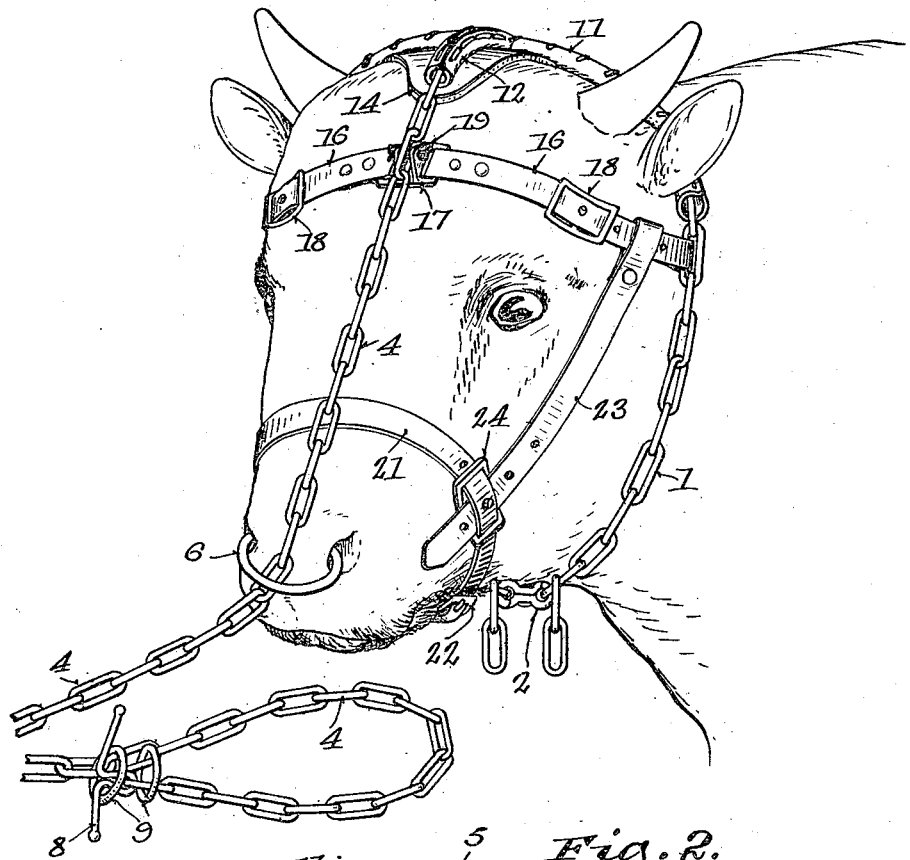
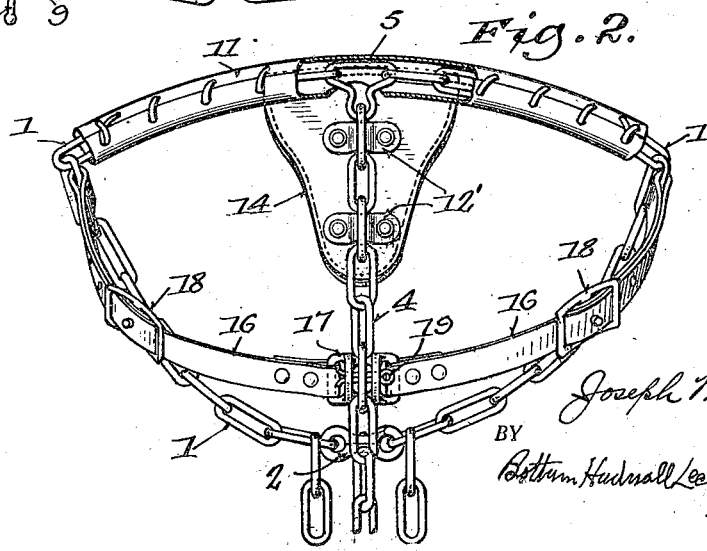
INVENTOR:
Joseph Moyer
BY
ATTORNEYS.

Patented June 17, 1924.

1,498,397

UNITED STATES PATENT OFFICE.

JOSEPH MOYER, OF STOCKBRIDGE, WISCONSIN.

BULL TIE.

Application filed May 22, 1922. Serial No. 562,619.

*To all whom it may concern:*

Be it known that I, JOSEPH MOYER, a citizen of the United States, residing at Stockbridge, in the county of Calumet and State of Wisconsin, have invented certain new and useful Improvements in Bull Ties, of which the following is a specification, reference being had to the accompanying drawing, forming a part thereof.

This invention relates to halters for confining and leading cattle, particularly bulls.

The main objects of the invention are to provide a strong, durable device of this class which can be readily adjusted to fit the head of an animal and when adjusted and applied will effectively restrain the animal, particularly a powerful and cross or vicious bull, without injuring or irritating it; and generally to improve the construction and increase the convenience and reliability of such devices.

It consists in the construction, arrangement and combination of parts as hereinafter particularly described and pointed out in the claims.

In the accompanying drawing like characters designate the same parts in the several figures.

Figure 1 is a perspective view of a tie or halter embodying the invention as applied to the head of a bull; and Fig. 2 is a perspective view of a slightly modified construction of the device by itself without the nose and cheek bands shown in Fig. 1.

The tie or halter may be made entirely of chain or of leather straps or bands of webbing, with suitable metal fittings. It is preferably constructed as shown, partly of chain and partly of leather straps.

It comprises a neck piece or collar 1, preferably made of chain and provided with a releasable and adjustable fastening such as an ordinary repair link 2, which may be connected with different links of the chain at or adjacent its ends, for adjusting the collar to fit animals of different sizes, and releasably fastening it around the neck of the animal to which it is fitted and applied, and which is not liable to be accidentally disengaged.

A hitching or leading line 4, preferably made of chain as shown, is connected at one end, as by a three-lobed or looped ring 5, shown in Fig. 2, with the upper part of the collar so as to extend forwardly over the head of the animal and centrally downward along the face of the animal loosely through a ring 6, such as an ordinary bull or nose ring, as shown in Fig. 1, which serves as a guide for the chain 4, confining it in place and making it effective for leading and securely holding the animal when hitched.

The chain 4 is provided at its free end with a cross bar 8, and adjacent that end with one or more rings 9, through which the cross bar is inserted, to hitch the animal to a stanchion, post or other convenient fixture.

To prevent chafing or injuring the neck and head of the animal, and to promote its comfort, the upper part of the neck chain 1 and the adjacent end of the hitching and leading chain 4 are provided with flexible shields 11 and 12, made of leather or other suitable material, laced, stitched, or otherwise fastened around the chains and attached to each other to hold them with the hitching and leading chain, in place. A pad 14, which may be made of leather or similar material and faced with felt or the like, is stitched or otherwise fastened to the under side of the shields 11 and 12, to further protect the neck and head of the animal and promote its ease and comfort.

A front piece or stay, connecting the chain or line 4 with the sides of the neck chain or collar 1, preferably consists of two straps or bands 16 adjustably connected by a metal fitting 17 with a link of the chain 4, and at the opposite ends with corresponding links of the neck chain or collar 1, so as to extend across the forehead of the animal between its ears and eyes. The straps or bands 16 are looped at the ends opposite the fitting 17 through corresponding links of the neck chain 1, and are adjustably fastened by buckles 18, so as to lengthen or shorten the stay according to the size of the animal to which the tie or halter is applied. The fitting 17 is formed with loops, to which the adjacent folded ends of the straps or bands 16 are fastened by rivets or otherwise. The fitting 17 is also formed on the outer side with spaced ears between which the chain 4 passes, and through which and an intervening link of the chain, a pin or cotter 19 is inserted. By connecting the fitting 17 with different links of the chain 4, the front stay is adjusted up or down to properly fit the animal.

To more effectively confine the connection between the neck chain or collar 1 and the hitching and leading chain 4 in its proper central position over the head of the animal, the tie or halter may be provided, as shown in Fig. 1, with a nose band or piece 21, provided with a buckle or adjustable fastening 22, for placing it on and fitting it to the nose of the bull or other animal. It is adjustably connected at the sides with the front stay by check bands or pieces 23, which are loosely looped and fastened at their upper ends around the stay straps or bands 16, between the buckles 18 and the neck chain or collar 1. At their lower ends the bands 23 are adjustably fastened to the band 21 by buckles 24.

The nose and cheek bands 21 and 23, forming with the stay bands 16 and collar 1, a kind of head-stall, prevent the hitching and leading chain or line 4 between the collar 1 and nose ring 6, from shifting sidewise away from its proper central position, but may be omitted, as shown in Fig. 2.

For the buckles 18 and 24, the construction shown, consisting of an elongated quadrangular frame having terminal cross bars and a middle cross bar provided with a central stud, is preferred, as no stitching, rivets or extra fastening means is required for the attachment of straps or bands thereto.

As shown in Fig. 2, the shield 12 is omitted and the hitching and leading chain 4 is secured to the pad 14 and held in place by straps or bands 12' of leather or other material riveted or otherwise fastened to the pad.

I claim:

1. A bull tie comprising a collar, a nose ring, and a hitching and leading line fastened to the top of the collar and adapted to pass forwardly and downwardly therefrom over the face of an animal loosely through the nose ring.

2. A bull tie comprising a collar provided with fastening means for securing it around the neck of an animal, a hitching line fastened at one end to the top of the collar and adapted to pass forwardly and downwardly therefrom over the face of the animal loosely through a ring inserted in the nose of the animal, and a front stay fastened at the ends to the collar and midway between its ends to the hitching line.

3. A bull tie comprising a collar having separable ends and provided with adjustable fastening means for connecting the ends and fitting it to the neck of an animal, a hitching line fastened at one end to the top of the collar and adapted to pass forwardly and downwardly therefrom loosely through a ring inserted in the nose of the animal, and a front stay adjustably fastened at its ends to the sides of the collar and at the middle to the hitching line.

4. A bull tie comprising a collar provided with fastening means for securing it around the neck of an animal, a hitching line fastened at one end to the top of the collar and adapted to pass forwardly and downwardly therefrom loosely through a ring inserted in the nose of the animal, a front stay fastened at the ends to the sides of the collar and at the middle to the hitching line, a nose piece adapted to encircle the nose of the animal, and cheek pieces connecting the nose piece with the front stay on opposite sides of the hitching line.

5. A bull tie comprising an adjustable collar, a nose ring, a hitching line fastened to the top of the collar and adapted to pass forwardly and downwardly therefrom over the head of an animal loosely through the nose ring inserted in the nose of an animal, a front stay adjustably fastened at the ends to the sides of the collar and at the middle to the hitching line, an adjustable nose piece adapted to pass around the nose of the animal, and adjustable cheek pieces connecting the nose piece with the front stay on opposite sides of the hitching line.

6. In a bull tie the combination of a chain collar provided with a releasable fastening; a chain hitching line connected at one end with the top of the collar and adapted to pass forwardly and downwardly therefrom over the head of an animal loosely through a ring inserted in the animal's nose; a front stay comprising a metal fitting connected with a link of the hitching line adjacent the top of the collar and straps connecting the fitting with corresponding links in the sides of the collar; and a pad attached to the top of the collar and the adjacent end of the hitching line.

7. In a bull tie the combination of a chain collar provided with a releasable fastening, a chain hitching line connected at one end with the top of the collar and adapted to pass forwardly and downwardly therefrom over the head of an animal loosely through a ring inserted in the animal's nose, and flexible shields covering the upper part of the collar and adjacent end of the chain hitching line.

8. In a bull tie the combination of a chain collar provided with a releasable fastening, a chain hitching line fastened at one end to the top of the collar and adapted to pass forwardly and downwardly therefrom over the head of an animal loosely through a ring inserted in the animal's nose, flexible shields covering the chain in the upper part of the collar and adjacent end of the hitching line, and a pad attached to the under side of the shields.

9. In a bull tie the combination of a chain collar provided with a releasable fastening, a hitching chain fastened at one end to the top of the collar and adapted to pass forwardly and downwardly therefrom over the head of an animal through a ring in the animal's nose, and a flexible pad fastened to the under side of the collar chain and of the hitching chain adjacent their connection with each other.

In witness whereof I hereto affix my signature.

JOSEPH MOYER.